US006981772B2

(12) United States Patent
Kim

(10) Patent No.: US 6,981,772 B2
(45) Date of Patent: Jan. 3, 2006

(54) APPARATUS TO ALIGN PANELS IN PROJECTOR

(75) Inventor: Byung-Hee Kim, Kumi (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 10/415,363

(22) PCT Filed: Oct. 30, 2001

(86) PCT No.: PCT/KR01/01831

§ 371 (c)(1),
(2), (4) Date: Apr. 28, 2003

(87) PCT Pub. No.: WO02/37181

PCT Pub. Date: May 10, 2002

(65) Prior Publication Data

US 2004/0012982 A1 Jan. 22, 2004

(30) Foreign Application Priority Data

Oct. 31, 2000 (KR) ........................... 2000-64260

(51) Int. Cl.
G03B 21/28 (2006.01)
G03B 21/00 (2006.01)
G03B 21/22 (2006.01)
G02F 1/1335 (2006.01)
G02F 1/1333 (2006.01)

(52) U.S. Cl. ................. 353/81; 353/33; 353/119; 349/57; 349/58

(58) Field of Classification Search ............... 353/30, 353/31, 33, 20, 81, 94, 100, 119; 359/831, 359/494–498; 349/8, 9, 57, 58
See application file for complete search history.

(56) References Cited

U.S. PATENT DOCUMENTS 6,565,213 B1 * 5/2003 Yamaguchi et al. .......... 353/33
6,595,645 B2 * 7/2003 Shiraishi et al. ............. 353/57

FOREIGN PATENT DOCUMENTS

JP 11-025344 2/1999
KR 1996-046131 12/1996

* cited by examiner

Primary Examiner—Alan A. Mathews
Assistant Examiner—Andrew Sever
(74) Attorney, Agent, or Firm—Fleshner & Kim, LLP

(57) ABSTRACT

An apparatus is provided which maintains alignment of panels in a projector. The apparatus includes a synthesizing system holding device positioned at an upper portion of a synthesizing system of the projector which securely supports the synthesizing system and maintains a relative position of various components of the synthesizing system, even in the event of an external force or vibration applied to the projector. This apparatus can prevent deviation or misalignment between at least two or more prisms and panels in the synthesizing system of the projector, thereby improving reliability and durability of the projector and enhancing image quality.

18 Claims, 7 Drawing Sheets

APPARATUS TO ALIGN PANELS IN PROJECTOR

1. TECHNICAL FIELD

The present invention relates to an apparatus to align panels in a projector, and more particularly, to an apparatus to align panels in a projector for preventing deterioration of the quality of an image projected on a screen by maintaining alignment between the Liquid Crystal Display (LCD) panels to optical paths through precisely maintaining alignment of prisms and LCD panels.

2. BACKGROUND ART

In general, a projector is a device for projecting a strong beam of light on an image embodied in a panel, namely, an LCD panel and projecting an image signal on an external large-sized screen through a projection lens. Hereinafter, an LCD projector utilizing the LCD panel as a panel will be described.

FIG. 1. is a perspective view showing a state that an upper casing of a conventional LCD projector has been removed, FIG. 2 illustrates a perspective view of a synthesizing system area of the conventional LCD projector, and FIG. 3 illustrates an exploded perspective view of FIG. 2. As shown in the drawings, the LCD projector includes a casing 11, a projection lens 13 for projecting a beam synthesized by a synthesizing system 31 onto an external screen (not shown), an illuminating system 21 having a beam source (not shown) provided at an inner side of the casing 11 and a plurality of optical lenses, optical filters and reflection mirrors, which are not shown in the drawings, for dividing a beam irradiated from the beam source into three color beams, that is, a red color beam, a green color beam, and a blue color beam, and forming three optical paths.

A synthesizing system 31 is disposed between the illuminating system 21 and the projection lens 13 for synthesizing divided beams and providing the beams to the projection lens 13, and a cooling system 61 and cooling system casing 63 is provided for cooling the synthesizing system 31.

An illuminating system casing 22, which divides beams irradiated from the beam source mounted therein into three color beams of red, green and blue, and forms three paths for each beam, is disposed at a peripheral area of the synthesizing system 31.

Moreover, the synthesizing system 31 includes a plurality of dichroic prisms 35 mounted in predetermined intervals and parallel to each other, on a plurality of LCD panels 33, and a prism holder 37 for supporting the dichroic prisms 35.

The prism holder 37 includes a holder body 39 having a horizontal part 41 arranged parallel to a bottom surface of the casing 11 and a vertical member 45 vertically placed on the side of the horizontal part 41. The vertical member 45 has a center passage through which the projection lens 13 is inserted, and top and bottom plates 49 and 51 respectively are placed at the top and bottom of each prism 35 to provide support for the prisms 35.

Furthermore, the prisms 35 are provided on three sides other than the side in which the projection lens 13 is connected. Adjacent prisms 35 are arranged at a right angle to each other, and an upper plate 49 is connected to an upper part of the prisms 35 for fastening the prisms 35 in relative positions to one another. Additionally, the top plate 49 has a plurality of screw holes 50 for fastening a fixed board 34 supporting the LCD panels 33 with fixing screws 42.

The vertical member 45 of the holder body 39 has a plurality of screw holes 47 at both sides thereof for connecting the illuminating system casing 22. The screw holes 47 are separated from each other along a vertical direction. The horizontal part 41 has a seating portion (not shown) for seating the bottom plate 51, to which the prisms 35 are connected. The seating portion has LCD panel connecting holes 43 in a circumferential area thereof for arranging the LCD panels 33, parallel to each other, on an outer side of each prism 35.

Meanwhile, if light projected from the beam source is divided by the illuminating system 21 and passes the corresponding LCD panels 33, each LCD panel 33 is increased in temperature due to an increase of heat flux. Furthermore, generally, if the temperature of the LCD panel 33 is increased by more than a prescribed temperature, namely, critical temperature, elements are damaged. Therefore, a cooling means (not shown) is provided for cooling the synthesizing system 31 through inducing the outside air in an adjacent area (especially, an upper portion) of the synthesizing system 31, or for discharging the inside air to the outside.

However, components of a conventional LCD projector as described may be moved from an original position due to vibration of the cooling fan, causing deterioration in image quality. For example, the optical path of the prisms 35 and/or the LCD panels relative to the optical paths of the projection lens 13 may be disturbed, and pixel positions of three color beams projected to the LCD panels and formed on the screen are different from each other.

Meanwhile, in the case of an LCD projector which is installed on the ceiling, a fixed board 34 supporting the LCD panel 33 at the upper portion may become misaligned due to the effects of repeated vibration, as well as gravity, causing misalignment between the LCD panels 33 and/or the prisms 35 to the respective optical paths.

3. DISCLOSURE OF INVENTION

Accordingly, the present invention is directed to a device and a method for operating the same that substantially obviates one or more problems due to limitations and disadvantages of the related art.

It is an object of the present invention to provide an apparatus to align panels in a projector, which can prevent deterioration of quality of image due to deviation of alignment between LCD (Liquid Crystal Display) panels and/or prisms to optical paths, that is, change of relative position due to misalignment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the above object, the present invention provides an apparatus to align panels in a projector including: a synthesizing system having prisms formed at a rear portion of a projection lens for synthesizing a beam, panels mounted parallel to the prisms for forming an image and a prism holder having an upper plate located on the upper portion of the prisms for supporting the prisms and the panels; an illuminating system casing having a receiving space opened toward a projection lens side for putting the synthesizing system on the casing and optical paths for irradiating different beams on the panels; and a synthesizing system holding plate for holding the synthesizing system at an upper portion, the synthesizing system holding plate having both ends located on the illuminating system casing and at least one portion located on the upper plate.

By preventing misalignment between the prisms and the LCD panels due to vibration by supporting the prisms and the LCD panels at both ends along a vertical direction, the apparatus to align panels in projector according to the present invention can continuously maintain an initial alignment state and thus prevent deterioration of image quality. Additionally, misalignment of the LCD panels and the prisms of a ceiling mounted type projector due to gravity can be effectively prevented.

It is to be understood that both the foregoing general description and the following detailed description of the present invention are exemplary and explanatory and are intended to provide further explanation of the invention as claimed.

4. BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

5. BEST MODE FOR CARRYING OUT THE INVENTION

Figure 1:
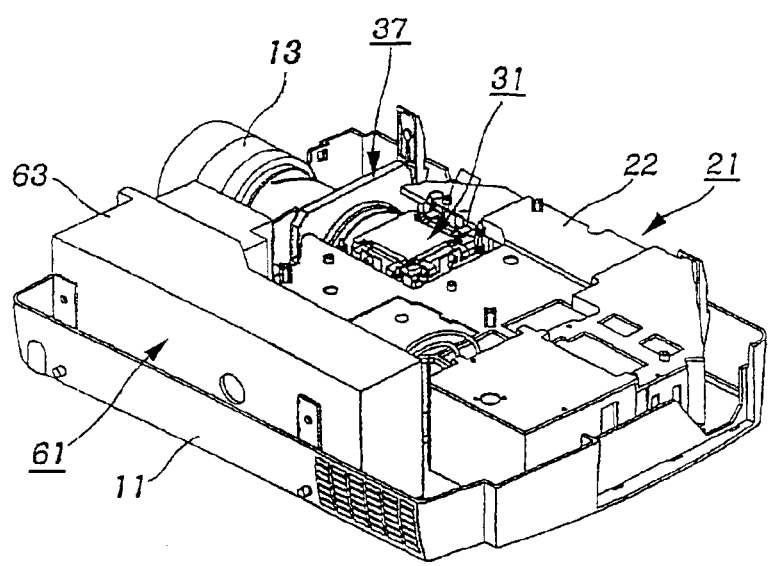
FIG. 1 is a perspective view of a conventional LCD (Liquid Crystal Display) projector with an upper casing removed.
Figure 2:
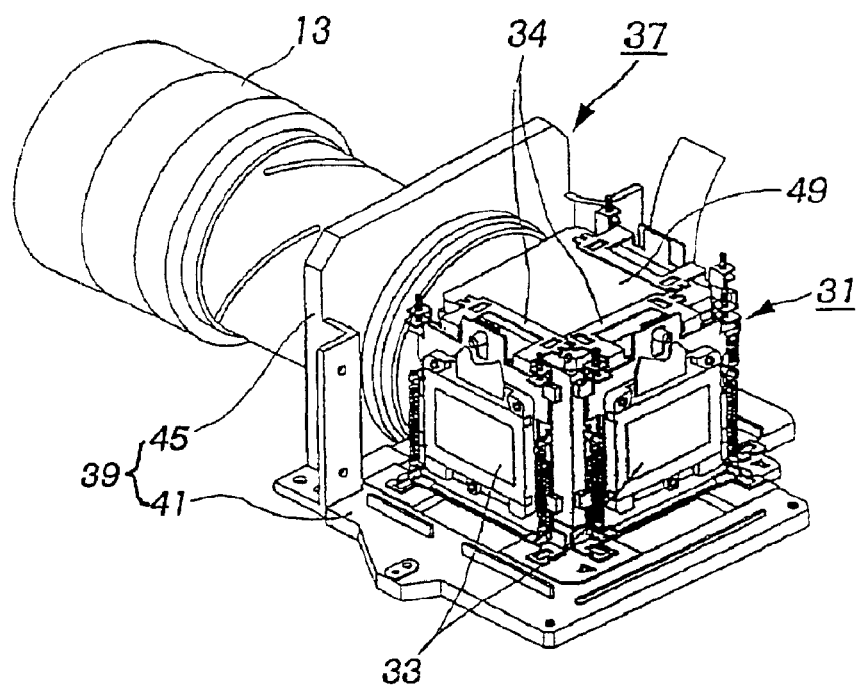
FIG. 2 is a perspective view of a synthesizing system area of the conventional LCD projector shown in FIG. 1.
Figure 3:
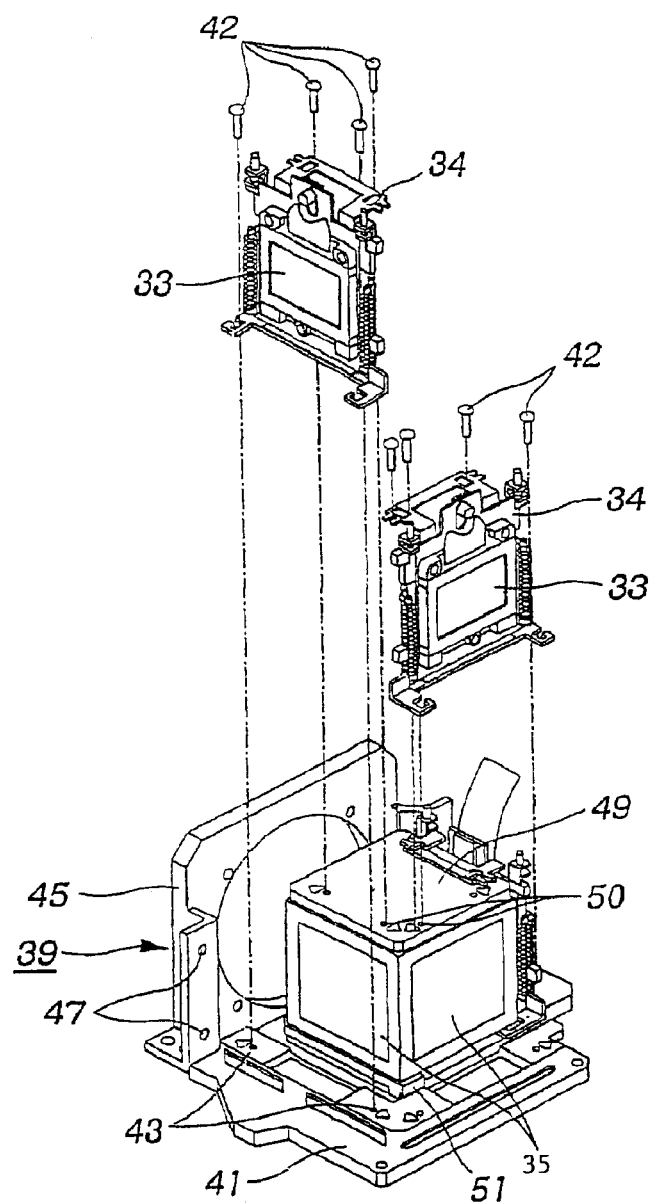
FIG. 3 is an exploded perspective view of the synthesizing system shown in FIG. 2.

Reference will now be made in detail to the preferred embodiments of the present invention, examples of which are illustrated in the accompanying drawings. For reference, like reference characters designate corresponding parts throughout several views.

Figure 4:
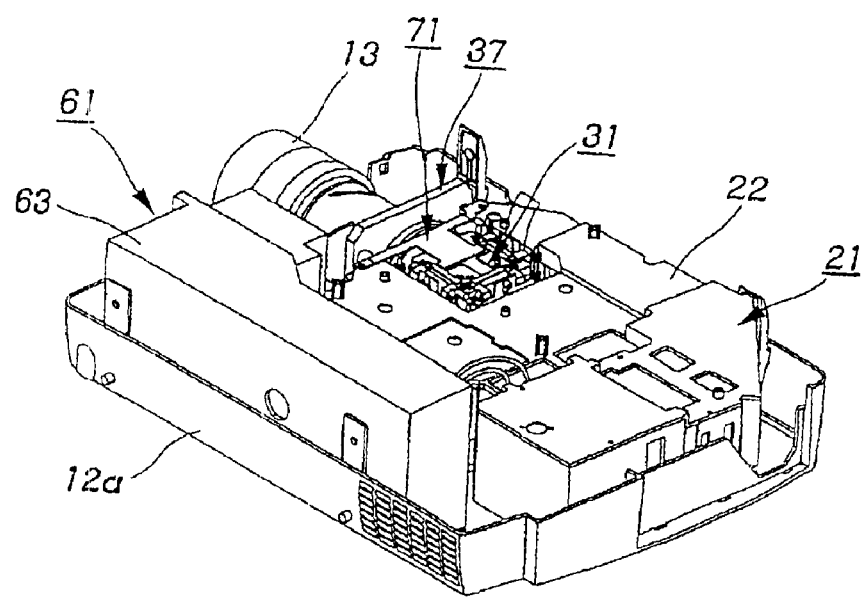
FIG. 4 is a perspective view of a LCD projector according to the present invention with an upper casing removed.
Figure 5:
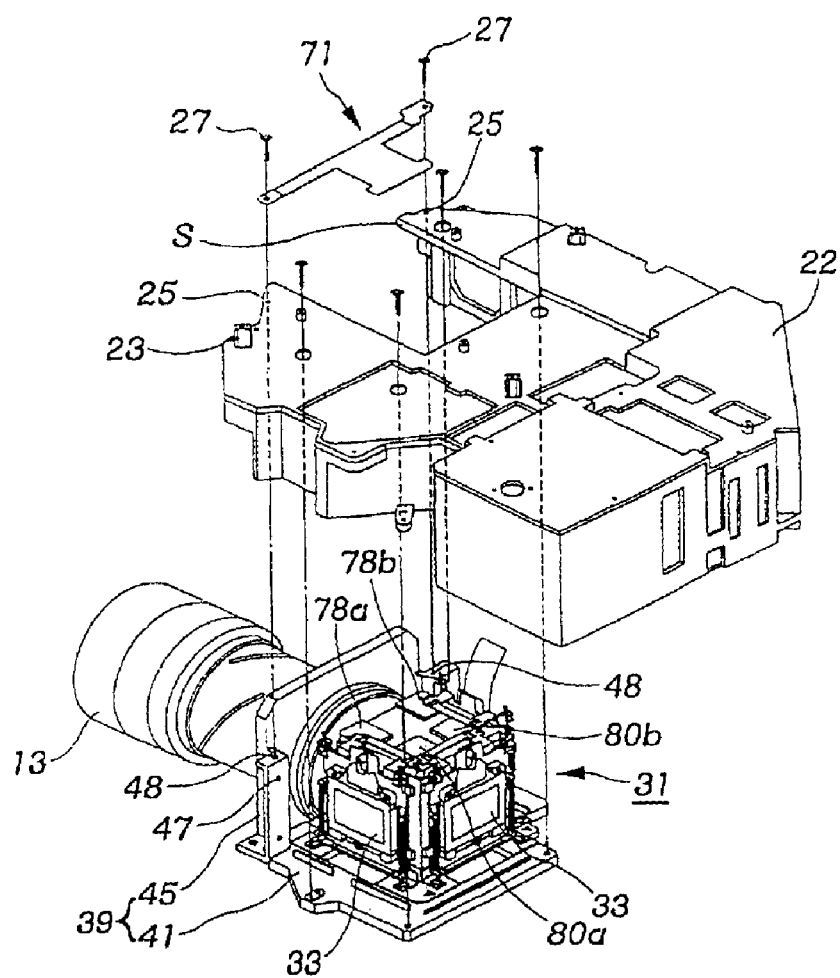
FIG. 5 is an exploded perspective view of the LCD projector shown in FIG. 4, partially enlarged.
Figure 6:
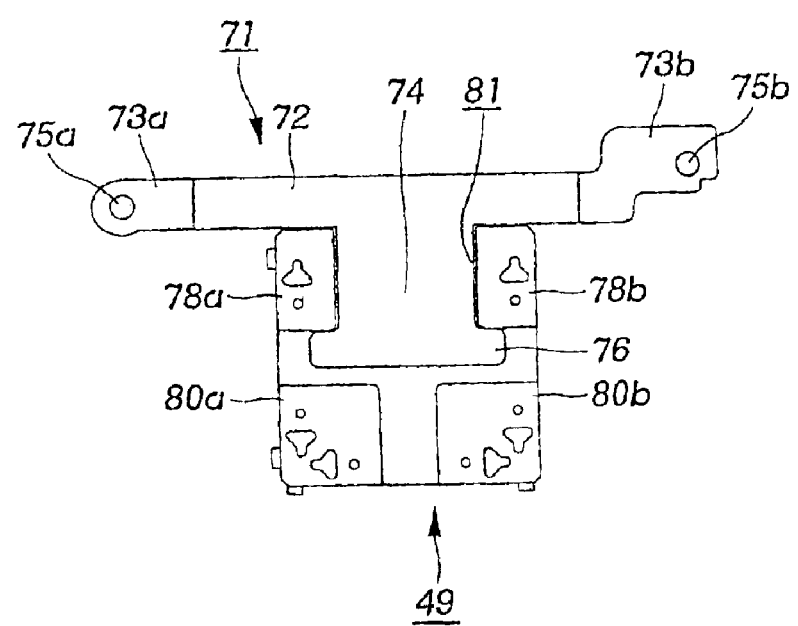
FIG. 6 is an enlarged plan view of a supporting plate area of the synthesizing system shown in FIG. 4.
Figure 7:
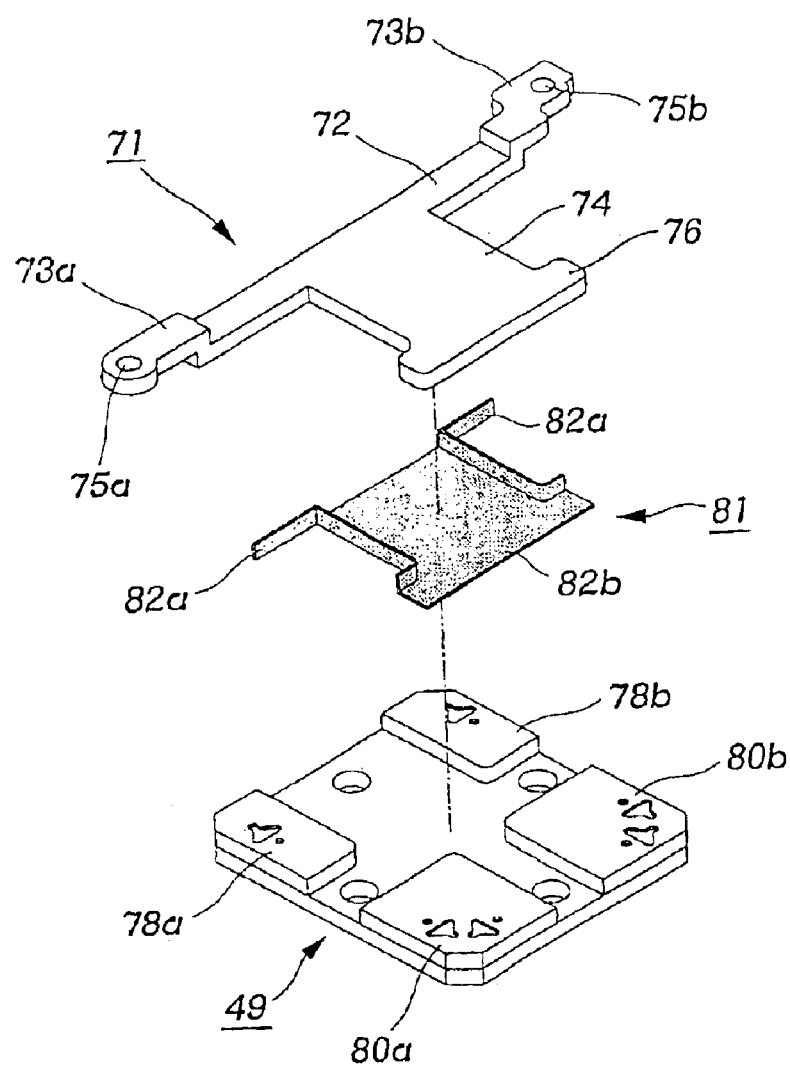
FIG. 7 is an enlarged perspective view showing a state before the supporting plate of the synthesizing system of FIG. 6 is connected.

FIG. 4 illustrates a perspective view showing a state that an upper casing of a LCD projector according to the present invention is removed, FIG. 5 illustrates an exploded perspective view of the LCD projector shown in FIG. 4, partially enlarged, FIG. 6 illustrates an enlarged plan view of a supporting plate area of the synthesizing system of FIG. 4, and FIG. 7 illustrates an enlarged perspective view showing a state before the supporting plate of the synthesizing system of FIG. 6 is connected.

For reference, reference numerals designating the same structure and components as the conventional apparatus described in the description of the related art section will be omitted.

As shown in the drawings, an LCD (Liquid Crystal Display) projector includes a lower casing 12a formed in a rectangular shape and having a receiving space formed therein by coupling with an upper casing, (not shown), a projection lens 13 placed at a side of the lower casing 12a, a synthesizing system 31 disposed on a side of the projection lens 13 along a longitudinal direction of the projection lens 13 inside the lower casing 12a, and an illuminating system casing 22 arranged to surround the synthesizing system 31 at a side. The illuminating system casing 22 divides beams from a beam source inside the casing 22 into three color beams of red, green and blue colors, and irradiates the beams on LCD panels 33 of the synthesizing system 31. The projector also includes a cooling fan part having a cooling fan (not shown) provided adjacent the synthesizing system 31 (especially, an upper portion) to cool the heat generated from the inside of the projector, and a synthesizing system holding plate 71 for preventing distortion and/or misalignment of the synthesizing system 31. Both ends of the holding plate 71 are fixed on an upper surface of the illuminating system casing 22 and a prescribed area arranged on an upper surface of the synthesizing system 31 to contact with the synthesizing system 31.

Moreover, as shown in FIG. 5, the illuminating system casing 22 has a receiving space (S) opened toward the projection lens 13 side to house an assembly of the LCD panels 33 and prisms 35. Both ends of the receiving space (S) are fixed and coupled to a vertical member 45 of a holder body 39. A beam source (not shown) is arranged inside of the illuminating system casing 22, and a plurality of optical lenses and optical filters (not shown) are dispersedly arranged to divide beam generated from the beam source into three color beams of red, green and blue colors.

Furthermore, the illuminating system casing 22 has a plurality of boss parts 23 which project so as to couple to a circuit chassis (not shown), and the projection lens 13 side of the casing 22 has a screw hole 25 for passing a fixing screw 27 therethrough so as to couple the synthesizing system holding plate 71 to the casing 22. Correspondingly, the vertical member 45 of the holder body 39 has a screw coupling hole 48 for receiving the fixing screw 27 which has passed through the screw hole 25.

Additionally, in order to compensate for the difference in height between the illuminating system casing 22 and the synthesizing system 31, the synthesizing system holding plate 71 includes a connection part 72 having a length corresponding to a width of the receiving space(S) and bent end parts 73a and 73b first bent upward in a vertical direction and then bent parallel to the upper surface of the illuminating system casing 22, a projection 74 extending vertically on a central portion of the connection part 72, and a movement restricting projection 76 enlarged from the end of the projection 74 in the direction of a width of the projection 74. The bent end parts 73a and 73b each have screw holes 75a and 75b, respectively, passing through the surface of the plate 71.

Additionally, the prism holder 37 includes a rectangular lower plate 51 disposed on a lower portion of the prism 35, a rectangular upper plate 49 disposed on an upper portion of the prism 35, a horizontal part 41 on which the lower plate 51 is seated and connected, and a holder body 39 having the vertical member 45 placed vertically relative to the horizontal part 41. An optical tube of the projection lens 13 passes through the central area of the vertical member 45.

Meanwhile, the upper plate 49 has a pair of movement restricting parts 78a and 78b at the upper surface thereof.

The movement restricting parts 78*a* and 78*b* touch both sides of the projection 74 and are elevated so as to receive the projection 74 along a width direction. Each movement restricting part 78*a* and 78*b* is in the form of a rectangular plane projection. A side of the projection lens 13 side contacts a side of the connection part 72, and the other side of the projection lens 13 has a width sized to contact an inner surface of the movement restricting projection 76. Especially, it is preferable that a contact line of the movement restricting parts 78*a* and 78*b*, the projection 74 and the movement restricting projection 76 is in a straight line for absorbing shock from all directions.

At a corner part of the upper plate 49 corresponding to the movement restricting parts 78*a* and 78*b*, height compensating parts 80*a* and 80*b* having the same height as the movement restricting parts 78*a* and 78*b* are formed. The height compensating parts 80*a* and 80*b* maintain the holding panels 71 of the LCD panels 33 at the same height relative to each other when they are connected.

Meanwhile, a buffering member 81 is placed between contact surfaces of the projection 74 and the upper plate 49 as a means for restricting transfer of the vibration from the illuminating system casing 22, which is in contact with the cooling system casing 63, to the LCD panels 33 and the prisms 35 via the projection 74. The buffering member 81 includes a side wall part 82*a* interposed between the side parts of the movement restricting parts 78*a* and 78*b* and side parts of the connection part 72, the projection part 74 and the movement restricting projection 76 of the synthesizing holding plate 71, and a lower surface part 82*b* interposed between the projection 74 and the upper plate 49.

Referring to the above structure, a connecting process of the present invention will be described in brief. The prisms 35 are placed in upright positions along three sides except for the side in which the projection lens 13 lies, and the upper plate 49 is connected on the upper portion of the prisms 35. The lower plate 51 is seated on the holder body 39, and the corresponding LCD panels 33 are coupled to the upper plate 49 and the holder body 39.

The synthesizing system 31 is placed in the inside the receiving space of the illuminating system casing 22, and the holder body 39 and the illuminating system casing 22 are coupled with each other.

Finally, the buffering member 81 is interposed between the upper plate 49 and the synthesizing system holding plate 71. The fixing screw 27 passes through the synthesizing system holding plate 71, then through the illuminating system casing 22 and into the vertical member 45 of the holder body 39 so as to couple the holding plate 71, casing 22, and holder body 39.

Hereinafter, the operation of the projector will be described. The beam irradiated from the beam source contained in the illuminating system casing 22 is divided into three color beams of red, green and blue colors by optical elements (a plurality of optical lenses and optical filters) arranged in the illuminating system casing 22, and the divided beams enter into the corresponding LCD panels 33. The beams passing the LCD panels 33 are synthesized through the prisms 35, enlarged and projected on the screen by the projection lens 13.

When a cooling fan mounted at a position (especially, the upper portion) adjacent the synthesizing system 31 is operated as the illuminating system 21 operates, the vibration generated as a result of operation of the cooling fan is transmitted to the synthesizing system 31, causing the alignment of the prisms 35 and the LCD panels 33 to be disturbed from the original position. At this time, a relative position is maintained by the synthesizing system holding plate 71, and the vibration of the illuminating system casing 22 is absorbed/reduced by the buffering member 81. Thus, the LCD panels 33 and the prisms 35 are stabilized an initial alignment position is maintained, and the quality of image projected on the screen is retained.

Meanwhile, in the above embodiment, the buffering member 81 is formed in a single body, but it will be appreciated that the buffering member 81 may be divided into a side wall part 82*a* and a lower surface part 82*b*. Alternatively, the buffering member 81 may be coated integrally with the surface of the contact surface of the synthesizing system holding plate 71.

The buffering member 81 may be made from sponge, synthetic or natural rubber and textile.

Furthermore, if the synthesizing system holding plate 71 is fixed onto the illuminating system casing 22 and forms the contact means with the upper plate 49, further conditions are not needed, and its detailed contact shape is not restricted in this embodiment.

The forgoing embodiments are merely exemplary and are not to be construed as limiting the present invention. The present teachings can be readily applied to other types of devices. The description of the present invention is intended to be illustrative, and not to limit the scope of the claims. Many alternatives, modifications, and variations will be apparent to those skilled in the art.

6. INDUSTRIAL APPLICABILITY

The apparatus to align panels in projector can prevent deviation (misalignment) between at least two or more prisms and panels, which are mounted on the synthesizing system, due to vibration.

What is claimed is:

1. An apparatus to align panels in a projector, the apparatus comprising:
   a synthesizing system having prisms formed at a rear portion of a projection lens for synthesizing a beam, panels mounted parallel to the prisms for forming an image, and a prism holder having an upper plate located on an upper portion of the prisms for supporting the prisms and the panels;
   an illuminating system casing having a receiving space opened toward a projection lens side thereof for putting the synthesizing system on the casing, and optical paths for irradiating different beams on the panels; and
   a synthesizing system holding plate for holding the synthesizing system at an upper portion, the synthesizing system holding plate having both ends located on the illuminating system casing and at least one portion located on the upper plate.

2. The apparatus according to claim 1, wherein the synthesizing system holding plate has bent end parts at both ends thereof to support the synthesizing system even though there is a difference in height between the illuminating system casing and the synthesizing system.

3. The apparatus according to claim 1, wherein the synthesizing system holding plate has a projection extending vertically in a direction of the synthesizing system to support the synthesizing system.

4. The apparatus according to claim 1, further comprising:
   a projection formed on the synthesizing system holding plate and extending in the direction of the synthesizing system for supporting the synthesizing system; and movement restricting parts protruding from the upper plate such that a side surface of the movement restricting parts contacts an outer circumference of the projection.

5. The apparatus according to claim 4, wherein the contact part between the projection and the movement restricting parts forms a straight line.

6. The apparatus according to claim 4, wherein the projection has a movement restricting projection extending from an end of the projection in a width direction of the projection, wherein the movement restricting projection contacts the movement restricting parts of the upper plate to reliably support the synthesizing system.

7. The apparatus according to claim 4, wherein the movement restricting parts are in the form of a rectangle.

8. The apparatus according to claim 1, further comprising a buffering member formed on the contact part, between the synthesizing system holding plate and the upper plate, for preventing vibration from being transmitted from the illuminating system casing to the synthesizing system.

9. The apparatus according to claim 8, wherein the buffering member is coated on at least one of the contact surfaces between the synthesizing system holding plate and the upper plate.

10. The apparatus according to claim 1, further comprising:
movement restricting parts protruding from a side of the upper plate, the movement restricting parts contacting a side surface of the synthesizing system holding plate for reliably supporting the synthesizing system; and
height compensating parts protruding from the other side of the upper plate to the same height as the movement restricting projections, the height compensating parts being supported by the upper plate and having the same height the panels at two or more portions.

11. The apparatus according to claim 1, further comprising:
a rectangular lower plate disposed on a lower portion of the prism on the prism holder;
a horizontal part on which the lower plate is seated and connected; and
a vertical member formed at a right angle to the horizontal part, the vertical member having a central area which allows an optical tube of the projection lens to pass therethrough.

12. The apparatus according to claim 1, wherein the panel is a Liquid Crystal Display (LCD) panel.

13. A structure to align panels in a projector, the structure comprising:
a projection lens;
prisms located on a rear portion of the projection lens for synthesizing beams;
panels mounted parallel to the prisms for forming an image;
a prism holder located on an upper portion of the prisms, the prism holder having an upper plate with lower edge portions for supporting the prisms, a rectangular lower plate disposed at a lower portion of the prisms, a horizontal part on which the lower plate is seated and connected, and a vertical member standing on the horizontal part with a central area for passing an optical path of the projection lens therethrough;
an illuminating system casing having a receiving space opened toward a prescribed direction for putting the prism holder thereon, and optical paths for irradiating different beams on the panels;
a synthesizing system holding plate having a connection part, the connection part having bent end parts, the bent end parts being vertically bent at both ends and fixed on the illuminating system casing with a prescribed coupling member, and a projection projecting toward the upper plate at a prescribed position of the connection part for supporting the upper plate at an upper portion; and
movement restricting parts protruded upward from the upper plate, a side surface of the movement restricting parts contacting a side surface of the synthesizing system holding plate for supporting the upper plate even in the event of a lateral vibration.

14. The structure according to claim 12, further comprising height compensating parts formed protruding from the other side of the upper plate to the same height as the movement restricting parts so as to make the panels have the same installation height.

15. The structure according to claim 12, wherein the projection has a movement restricting part formed at an end portion thereof, the movement restricting part extending in a width direction of the projection and having a side surface contacting the movement restricting parts of the upper plate for restricting misalignment of the panels due to an external shock.

16. The structure according to claim 12, wherein a buffering member is inserted into the contact surface formed between the synthesizing system holding plate and the upper plate for effectively restricting transmission of an external vibration.

17. The structure according to claim 12, further comprising a hole formed in a fixing bond disposed on the upper portion of the panels, and a coupling member inserted into the hole of the upper plate, to couple the panels to the upper plate.

18. A structure to align panels in a projector, the structure comprising:
a synthesizing system including prisms, LCD panels, and a prism holder for synthesizing beams;
an illuminating system having optical paths for irradiating different beams on the LCD panels at an adjacent position of the synthesizing system; and
synthesizing system holding means having both ends located on the illuminating system casing and at least one area located on an upper plate portion of the holding means for supporting the synthesizing system at an upper portion and for restricting misalignment of the LCD panels due to vibration.

* * * * *